Figure 1:
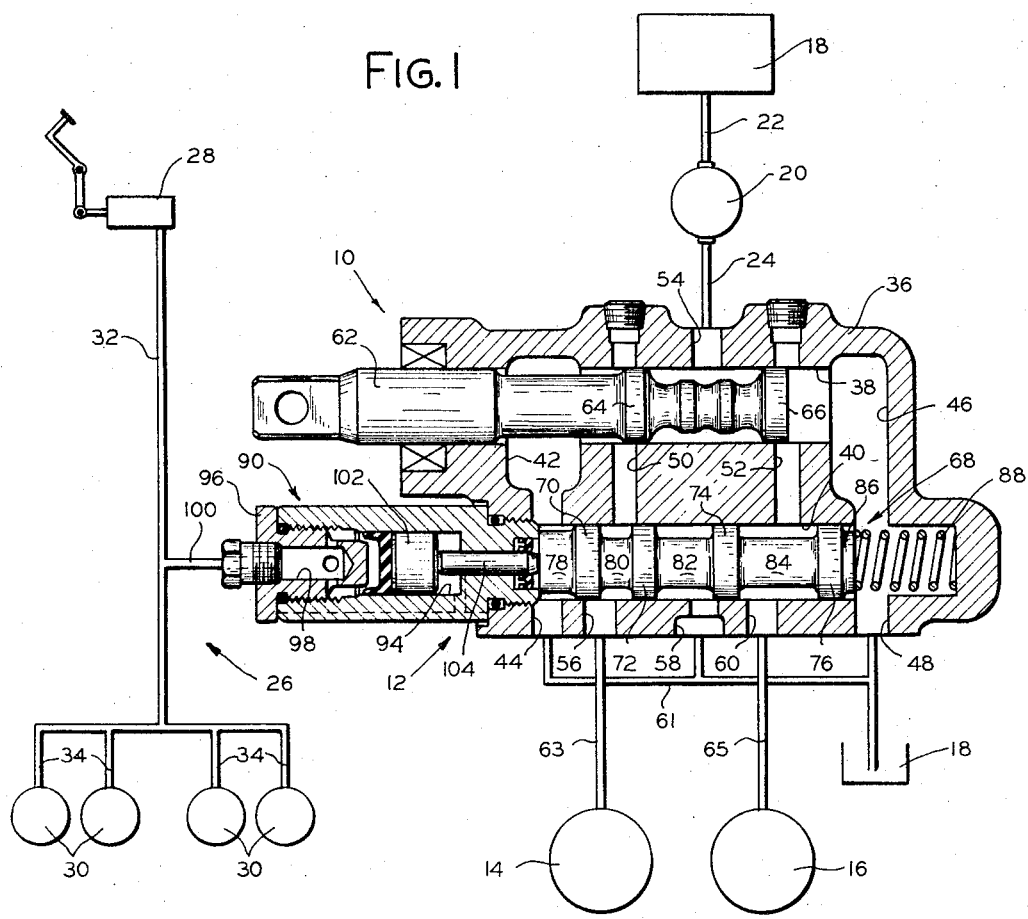

Feb. 6, 1968  W. C. ERDMAN ETAL  3,367,356
REVERSIBLE VALVE
Filed Oct. 20, 1965

INVENTORS
WILLIAM C. ERDMAN
WAYNE R. HOWARD
KENNETH C. HYBARGER
BY
*Robert H. Johnson*
ATTORNEY

United States Patent Office 3,367,356
Patented Feb. 6, 1968

3,367,356
REVERSIBLE VALVE
William C. Erdman, Wayne R. Howard, and Kenneth C. Hybarger, Jackson, Mich., assignors to Clark Equipment Company, a corporation of Michigan
Filed Oct. 20, 1965, Ser. No. 498,445
3 Claims. (Cl. 137—270)

This invention relates to a valve, and more specifically to a valve having a reversible spool for changing the operation of the valve.

Power shifted constant mesh gear transmissions with a plurality of fluid actuated clutches often are used as part of the power train for tractor shovels, such as shown in U.S. Patent No. 3,160,299 issued Dec. 8, 1964. A power shifted constant mesh gear transmission which is suitable for use in such a vehicle is shown in U.S. Patent No. 3,126,752 issued Mar. 31, 1964.

Because of the nature of operation of a tractor shovel it is often desirable to be able to disengage the forward direction control clutch of the transmission whenever the vehicle brakes are applied. In order to accomplish this a declutch valve may be provided which is responsive to brake actuation and which operates to relieve fluid pressure only to the fluid pressure engaged forward clutch of the transmission.

In a transmission such as the one described in the above-mentioned patent the direction control shafts are located closely adjacent each other and generally side-by-side. Either of the direction control shafts may be utilized as the input shaft to the transmission, the other shaft serving to drive the transmission in the opposite direction. Conventionally, the direction which the transmission is driven through the input shaft is termed the forward direction, and so the other shaft is termed the reverse shaft. Because either shaft may be used as the input shaft different manufacturers of tractor shovels which utilize such transmissions may use different ones of the two direction control shafts for the input shaft. Thus, if the declutch valve is connected to relieve fluid pressure to the clutch associated with the input shaft (the forward clutch), then it would not operate to delutch the forward clutch if the other shaft is utilized as the input shaft since the clutch which the declutch valve serves to disengage would now be the reverse clutch. Consequently, the declutch valve now must be connected to the clutch associated with the other direction control shaft. It is difficult often to change the connections between the declutch valve and the various direction control clutches since many of the passages are cast into the transmission casing or control valve cover. Thus, it is a principal object of our invention to provide a valve which can be conditioned to decrease the fluid pressure to one or the other of two clutches by reversing the spool in the valve.

A further object of our invention is to provide a declutch valve which may be easily conditioned to disengage either one of two different clutches.

In carrying out our invention in a preferred embodiment thereof, we provide a valve having a body and a bore therein with a spool slideably disposed in the bore. The housing includes ports located therein which communicate with the bore. The spool includes lands on the periphery thereof which cooperate with the various ports so when one end of the spool is disposed adjacent one end of the bore, the valve serves to disengage one of two fluid actuated clutches when the spool is shifted, and when the position of the spool in the valve bore is reversed actuation of the valve serves to disengage the other of the two fluid actuated clutches.

Figure 2:
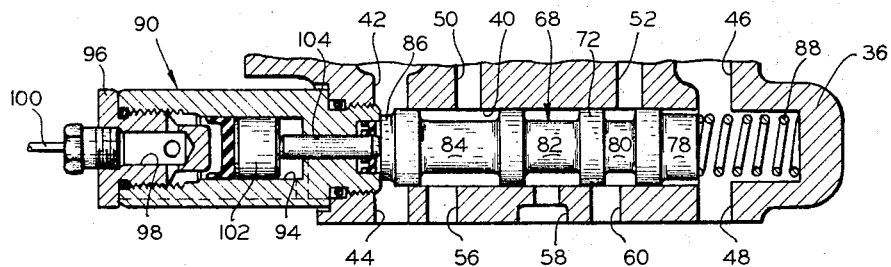

The above and other objects, features and advantages of our invention will be more readily understood by one skilled in the art when the following detailed description is read in conjunction with the accompanying drawing wherein:

FIGURE 1 shows our valve, and in diagrammatic fashion, the salient parts of the related transmission and brake system and FIGURE 2 is a fragmentary view showing our valve with the spool reversed in the bore.

Referring now to the drawing, the reference numeral 10 denotes generally a direction control valve which is associated with a declutch valve 12. These valves are associated with a pair of direction control clutches 14 and 16 of a power shifted constant mesh gear transmission. The fluid system of which these valves and clutches are a part includes a fluid reservoir 18 and a fluid pump 20. Fluid pump 20 draws fluid from reservoir 18 through a conduit 22 and supplies pressurized fluid to direction control valve 10 via a conduit 24. Declutch valve 12 also is associated with a brake system 26 which includes a foot pedal operated master cylinder 28 which, when the brake pedal is depressed by an operator, supplies pressurized fluid to a plurality of brake wheel cylinders 30 via a main conduit 32 and a plurality of branch conduits 34 which connect with main conduit 32.

Referring now especially to FIG. 1, it will be noted that direction control valve 10 and declutch valve 12 utilize a common body 36, although the two valves could be contained in separate bodies. Body 36 is somewhat elongated and has a pair of generally parallel bores 38 and 40 extending longitudinally thereof.

The ends of bores 38 and 40 are connected by a fluid passage 42 which includes a port 44 and a fluid passage 46 which includes a port 48. Bores 38 and 40 also are connected intermediate their ends by a pair of fluid passages 50 and 52, as shown. A supply port 54 which is connected to conduit 24 is located in body 36 and communicates with bore 38 intermediate fluid passages 50 and 52. Finally, three ports 56, 58 and 60 are located in body 36 and communicate with bore 40 intermediate ports 44 and 48, as shown. It will be noted that ports 44, 48 and 58 are connected to reservoir 18 by fluid circuitry 61 and that ports 56 and 60 are connected to clutches 14 and 16, respectively, by conduits 63 and 65, respectively.

Direction control valve 10 includes, in addition to bore 38, a spool 62 which is slideable reciprocally therein. Spool 62 includes a pair of longitudinally spaced apart annular lands 64 and 66 on the periphery thereof. In the position shown, lands 64 and 66 cooperate with fluid passages 50 and 52 to block fluid communication from port 54 to either passage 50 or 52. We prefer to refer to this position as the neutral position of direction control valve 10. When spool 62 is in the neutral position it will be noted that fluid passage 50 is in communication with passage 42 and hence with reservoir 18 while fluid passage 52 is in communication with passage 46 and hence also in communication with reservoir 18. Spool 62 may be shifted in either direction away from the neutral position, as shown. When spool 62 is shifted toward the left, as shown in FIG. 1, then port 54 is placed in fluid communication with passage 50 while passage 52 continues in communication with passage 46. On the other hand, when spool 62 is shifted toward the right, then port 54 is placed in communication with passage 52 and passage 50 continues in communication with passage 42.

Declutch valve 12 includes, in addition to bore 40, a spool 68 which is slideable reciprocally therein between two extreme positions. Spool 68 includes four longitudinally spaced apart annular lands 70, 72, 74 and 76 on the outer periphery thereof which define between the ends of spool 68 a plurality of grooves 78, 80, 84 and 86. With a spool 68 in the attitude and position shown in FIG. 1 passage 50 is connected to port 56 via groove 80 and passage 52 is connected to port 60 via groove 84. By attitude we mean the disposition of one end of the spool relative to one end of the bore in which the spool is disposed. When spool 68 is shifted to the right as viewed in FIG. 1, to its other extreme position, communication between passage 50 and port 56 is blocked by land 70 and instead port 56 is put in communication with port 44 via groove 78 while passage 52 continues in communication with port 60 via grove 84.

The attitude of spool 68 may be reversed by turning spool 68 end for end in bore 40 so that it is disposed as shown in FIG. 2. With spool 68 disposed as shown in FIG. 2 passage 50 is connected to port 56 via groove 84 and passage 52 is connected to port 60 via groove 80. When spool 68 is shifted to the right, as shown in FIG. 2, to its other extreme position, then passage 50 continues to be connected to port 56 via groove 84 and communication between passage 52 and port 60 is blocked by land 72 while port 60 is connected to port 58 via groove 82.

Spool 68 normally is biased toward a first extreme leftward position by a helical compression spring 88 and is moved toward the right, as shown in the drawing, to the other extreme position by means of an actuator 90. Actuator 90 includes a body 92 which is threadably connected to valve body 36 at the end of bore 40 opposite spring 88. A bore 94 is located in actuator body 92 and extends coaxially with bore 40. One end of bore 94 is closed by a cap member 96 which includes fluid passage 98 therein that is connected to conduit 32 of the brake system by conduit 100 so that pressurized brake fluid may be communicated to bore 94. Slideably disposed in bore 94 is a piston 102 which abuts a pin 104 that extends outwardly of one end of actuator body 92 to abut the adjacent end of spool 68. When sufficient fluid pressure is generated in the brake system 26, the force applied to the left end of spool 68 by actuator 90 overcomes the bias of spring 88 and causes spool 68 to shift to the right.

In order to enable persons skilled in the art to more readily understand our invention, we will now explain the operation of it. It will be assumed that direction control valve 10 and declutch valve 12 are associated with a tractor shovel in which the clutch 14 is the forward direction control clutch of a power shifted constant mesh gear transmission and that the associated tractor shovel has a hydraulic brake system 26. Further, it will be assumed that the tractor shovel is proceeding forwardly so that spool 62 is shifted to its leftward position, thereby supplying pressurized fluid from pump 20 to clutch 14 reverse clutch 16 at the same time being connected through valves 10 and 12 to reservoir 18 so that it is disengaged. Now, if the operator actuates master cylinder 28 to apply the vehicle brakes, the force applied through actuator 90 will be sufficient to overcome the bias of spring 88 when a predetermined fluid pressure is reached in brake system 26, so that spool 68 will be shifted to the right to its other extreme position. Consequently, clutch 14 will be connected to reservoir 18 and communication between supply port 54 and port 56 will be blocked. As a result, clutch 14 will be disengaged when the associated vehicle brakes are applied. At this point it will be appreciated that by varying the bias of spring 88 the valve 12 can be made to disengage clutch 14 earlier or later relative to the application of the vehicle brakes, as desired. Normally, the bias of spring 88 is chosen so that clutch 14 is disengaged shortly after initial application of the vehicle brakes.

Assuming now that valves 10 and 12 are utilized with a transmission in a tractor shovel which has clutch 16 as the forward direction clutch, then it will be necessary to change the attitude of spool 68 to that shown in FIG. 2. With the tractor shovel conditioned for forward drive, then spool 62 will be shifted to its rightmost position, shown in FIG. 1, so that pressurized fluid is directed from supply port 54 to fluid passage 52 and hence to clutch 16 which is now the forward clutch. As before, valve 12 serves merely to connect passage 50 with port 56 and passage 52 with port 60 as long as the vehicle brakes are not applied. Upon sufficient brake application actuator 90 will cause spool 68 to shift toward the right, as shown in FIG. 2, so that port 60 is connected to port 58 via groove 82, and hence reservoir 18 while at the same time land 72 blocks fluid communication between supply port 54 and port 60 with the result that clutch 16 is disengaged.

The above detailed description of a preferred embodiment of our invention is intended to be illustrative only, and should not be construed in any sense as limiting the scope of our invention. Various modifications, changes and the like no doubt will occur to others skilled in the art, but yet be within the scope and spirit of our invention. Therefore, the limits of our invention should be determined from the following claims.

We claim:

1. A valve comprising a body, a bore in the said body, first, second, third, fourth, fifth and sixth ports in the said body in communication with the said bore, and a spool disposed in the said bore, the said spool being movable between first and second positions and disposable with one end thereof toward one end or the other of the said bore, the said spool having first, second, third and fourth lands, the said lands and ports cooperating so that the said second and third ports are in communication with each other and the said fifth and sixth ports are in communication with each other when the said spool is in the said first position and the said one spool end is disposed toward either one end or the other of the said bore, the said first and third ports are in communication with each other and the said fifth and sixth ports are in communication with each other when the said spool is in the said second position and the said one spool end is disposed toward the said one end of the said bore, and the said second and third ports are in communication with each other and the said fourth and sixth ports are in communication with each other when the said spool is in the said second position and the said one spool end is disposed toward the said other end of the said bore.

2. A valve comprising a body, a bore in the said body, first, second, third, fourth, fifth and sixth ports in the said body in communication with the said bore, and a spool disposed in the said bore, the said spool being disposable in the said bore in a first attitude or a second attitude and movable between the first and second positions, the said spool including at least four lands, the said lands and ports cooperating so that when the said spool is in the said first attitude and position the said second and third ports are in communication with each other and the said fifth and sixth ports are in communication with each other, when the said spool is in the said first attitude and the said second position the said first and third ports are in communication with each other and the said fifth and sixth ports continue in communication with each other, when the said spool is in the said second attitude and the said first position the said second and third ports are in communication with each other and the said fifth and sixth ports are in communication with each other and when the said spool is in the said second attitude and position the said second and third ports continue in communication with each other and the said fourth and sixth ports are in communication with each other.

3. The combination comprising a valve body, first and second bores in the said body, first, second, third, fourth, fifth and sixth ports in the said body, the said first port communicating with the said first bore and the said second, third, fourth, fifth and sixth ports communicating with the said second bore, first, second, third and fourth passages in the said body connecting the said bores, a first spool disposed in the said first bore and movable between first, second and third positions, the said first spool having two lands which cooperate with the said first port and the said passages so that the said first port and second passage are in communication with each other and the said third and fourth passages are in communication with each other when the said first spool is in the said first position, the said first port is in communication with none of the said passages when the said first spool is in the said second position and the said first port and third passage are in communication with each other and the said first and second passages are in communication with each other when the said first spool is in the said third position, a second spool disposed in the said second bore, the said second spool being movable between fourth and fifth positions and disposable in first or second attitudes, the said spool having third, fourth, fifth and sixth lands, the said lands cooperating with the said second, third, fourth and fifth ports and the said second and third passages so that the said second passage and the said third port are in communication with each other and the said third passage and the said fifth port are in communication with each other when the said second spool is in the said third position and the said first or second attitude, the said second and third ports are in communication with each other and the said third passage and the said fifth port are in communication with each other when the said second spool is in the said first attitude and the said fourth position, and the said second passage and the said third port are in communication with each other and the said fourth and fifth ports are in communication with each other when the said second spool is in the said second attitude and the said fourth position.

No references cited.

M. CARY NELSON, *Primary Examiner.*

R. J. MILLER, *Assistant Examiner.*